United States Patent [19]
Mizui et al.

[11] Patent Number: 4,513,130
[45] Date of Patent: Apr. 23, 1985

[54] HYDROCARBON RESIN AND MODIFIED HYDROCARBON RESIN PRODUCT THEREOF

[75] Inventors: Kinya Mizui; Masami Takeda, both of Otake; Tadao Iwata, Chiba, all of Japan

[73] Assignee: Mitsui Petrochemical Industries, Ltd., Tokyo, Japan

[21] Appl. No.: 413,899

[22] Filed: Sep. 1, 1982

[30] Foreign Application Priority Data

Sep. 7, 1981 [JP] Japan ................................. 56-140738

[51] Int. Cl.³ ............................................ C08F 232/08
[52] U.S. Cl. .................................... 526/283; 526/281; 525/211; 525/285; 525/301; 524/554; 524/425; 524/413
[58] Field of Search ........................ 526/283, 280, 281

[56] References Cited

U.S. PATENT DOCUMENTS 3,356,660 12/1967 Moritz et al. ......................... 528/500
3,629,221 12/1971 Arakawa et al. ...................... 526/75
4,086,198  4/1978 Mizui et al. .......................... 525/285

Primary Examiner—Carman J. Seccuro
Attorney, Agent, or Firm—Cushman, Darby & Cushman

[57] ABSTRACT

A hydrocarbon resin consisting essentially of a copolymer of (A) an unsaturated chain hydrocarbon or a cyclic hydrocarbon having a vinylidene group and (B) 9,10-dihydrodicyclopentadiene or its derivative, or a hydrocarbon resin modified by addition reacting an ethylenically unsaturated carboxylic acid or its anhydride, or hydrogen, to the above-mentioned copolymer. The hydrocarbon resin and the modified hydrocarbon resin have a high softening point and a low melt viscosity, and are suitable for use in adhesives and traffic paints.

15 Claims, No Drawings

HYDROCARBON RESIN AND MODIFIED HYDROCARBON RESIN PRODUCT THEREOF

The present invention relates to a novel hydrocarbon resin and the modified product thereof. More specifically, it relates to a novel hydrocarbon resin and the modified product thereof having a high softening point and a low melt viscosity, and suitable for use in adhesives and traffic paints.

As is well-known in the fields of, for example, pressure-sensitive adhesives, hot melt-type adhesives, coating compositions, and traffic paints, various resins such as rosin type resins, alkyd resins, and epoxy resins can be used as tackifiers and adhesive raw materials. Of these resins rosin type resins have most desirably been used. However, rosin type resins cannot match the recent remarkably increasing demands because the raw materials thereof depend upon natural resources. Accordingly, various petroleum hydrocarbon resins have recently been developed to substitute for rosin type resins. For instance, hydrocarbon resins derived from the polymerization of a $C_5$ fraction including 1,3-pentadiene, isoprene, and 2-methyl-2-butene in the presence of a Friedel Crafts catalyst have been used in adhesives, coating compositions, and traffic paints.

Recently, low melt viscosity type tackifiers have been desired in hot-melt type adhesives and traffic paints, because an increase in working speed is required while maintaining uniform application and because an improvement in the application, e.g., the increase in the working speed and the drying rate, is required, due to the recent increasing traffic volume. For instance, the above-mentioned hydrocarbon resins derived from a $C_5$ fraction, when attempting to decrease in melt viscosity they have a tendency to reduce in the softening point, whereby the heat resistance or stability becomes poor and the attempt to increase the heat resistance or stability unevitably results in a high melt viscosity. Thus, hydrocarbon resins having both a low melt viscosity and a high heat resistance (high softening point) have not yet been developed.

Accordingly, the objects of the present invention are to eliminate the above-mentioned problems of the prior arts and to provide a novel hydrocarbon resin having a high softening point and a low melt viscosity as well as a high compression strength and a good weatherability.

Another object of the present invention is to provide a modified hydrocarbon resin suitable for use as a tackifier.

A further object of the present invention is to provide a process for preparing the above-mentioned hydrocarbon resins.

Other objects and advantages of the present invention will be apparent from the following description.

In accordance with the present invention, a hydrocarbon resin is provided consisting essentially of a copolymer of (A) at least one unsaturated hydrocarbon selected from the group consisting of (i) unsaturated chain hydrocarbons (i.e., linear or branched unsaturated hydrocarbons) and (ii) cyclic hydrocarbons having at least one vinylidene group and (B) at least one compound selected from the group consisting of 9,10-dihydrodicyclopentadiene and its derivatives, the amount of the polymerization unit of component (A) in the copolymer being 20 mol% to 98 mol% and that of component (B) in the copolymer being 80 mol% to 2 mol%.

The hydrocarbon resin according to the present invention has a softening point of 60° C. to 180° C. a melt viscosity of 5 cps to 10000 cps and a number-average molecular weight of 300 to 15000.

The above-mentioned copolymer desirably contains about 30 mol% to about 96 mol% of the polymerization unit of component (A) and about 70 mol% to about 4 mol% of that of component (B).

In accordance with the present invention, a modified hydrocarbon resin modified by addition reacting an ethylenically unsaturated carboxylic acid or its anhydride, or hydrogen, to the above-mentioned copolymer of component (A) and component (B) is also provided.

The unsaturated chain hydrocarbons usable as component (A) in the present invention include, for example, monoolefins having the general formula:

$$R_1R_2C=CR_3R_4 \qquad (I)$$

wherein $R_1$, $R_2$ and $R_3$ are independently hydrogen or a methyl group and $R_4$ is hydrogen or an alkyl group having 1 to 6 carbon atoms;
diolefins having the general formula:

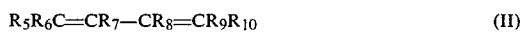

$$R_5R_6C=CR_7-CR_8=CR_9R_{10} \qquad (II)$$

or

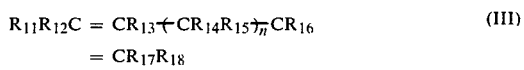

$$R_{11}R_{12}C = CR_{13}(CR_{14}R_{15})_n CR_{16} \qquad (III)$$
$$= CR_{17}R_{18}$$

wherein $R_5$, $R_6$, $R_9$, $R_{11}$, $R_{12}$ and $R_{17}$ are independently hydrogen or a methyl group, $R_7$, $R_8$, $R_{10}$, $R_{13}$ to $R_{16}$ and $R_{18}$ are hydrogen or an alkyl group having 1 to 6 carbon atoms, and n is an integer of 1 to 4; and
cyclic hydrocarbons having the general formula:

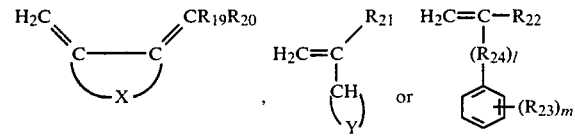

(IV)      (V)      (VI)

wherein $R_{19}$ to $R_{22}$ are independently hydrogens or a methyl group, $R_{23}$ is hydrogen or an alkyl group having 1 to 6 carbon atoms, and m is an integer of 0 to 3, $R_{23}$ may be the same or different in the case of m=2 or 3, $R_{24}$ is a saturated or unsaturated hydrocarbon chain having 1 to 6 carbon atoms, l is 0 or 1, X is a saturated or unsaturated hydrocarbon chain having 2 to 6 carbon atoms, Y is a saturated or unsaturated hydrocarbon chain having 3 to 7 carbon atoms, the hydrocarbon chain represented by X and Y may be substituted with an alkyl group having 1 to 4 atoms or a halogen atom.

Typical examples of monoolefins having the above-mentioned formula [I] are ethylene, propylene, 1-butene, 2-butane, isobutylene, 1-pentene, 2-pentene, 1-hexene, 2-hexene, 3-methyl-1-pentene, 4-methyl-1-pentene, 1-heptene, and 2-octane.

Typical examples of diolefins having the above-mentioned formula [II] or [III] are 1,3-butadiene, isoprene, 2,3-dimethyl-1,3-butadiene, 1,3-pentadiene, 2,3-dimethyl-1,3-hexadiene, 1,4-pentadiene, and 3,4,5-trimethyl-1,6-heptadiene.

Typical examples of cyclic hydrocarbons having a vinilidene group ($CH_2=C<$) and having the above-mentioned general formula [IV], [V] or [VI] are 1,2-dimethylidene cyclohexane, 1,2-dimethylidene cyclopentane, vinylcyclohexane, limonene, styrene, vinyltoluene, α-methylstyrene, isopropenyltoluene, tert-butylstyrene, allylbenzene, and p-tert-butyl-allylbenzene.

Of the above-mentioned hydrocarbons, chain diolefins having 4 to 6 carbon atoms, such as 1,3-butadiene, isoprene, 1,3-pentadiene, and 2,3-dimethylbutadiene, aromatic alkenyl compounds having 8 to 10 carbon atoms, such as styrene, α-methylstyrene, and vinyltoluene, and 1,2-dimethylidene compounds having 8 to 10 carbon atoms, such as 1,2-dimethylidene cyclohexane, and 4,5-dimethyl-1,2-dimethylidene cyclohexane, and mixtures thereof are desirable from the viewpoints of the resultant resin properties. Most desirable hydrocarbons are 1,3-pentadiene and/or a mixture thereof with one or more other hydrocarbons containing about 30% by weight of 1,3-pentadiene.

The above-mentioned hydrocarbons can be used, as component (A) of the present invention, alone or in any mixtures thereof, for example, mixtures of homologous compounds, mixtures of monoolefins and diolefins, mixtures of monoolefins and cyclic hydrocarbons having a vinylidene group, mixtures of diolefins and cyclic hydrocarbons having a vinylidene group, and mixtures of monoolefins, diolefins and cyclic hydrocarbons having a vinylidene group. Examples of these hydrocarbon mixtures generally available are various fractions containing unsaturated hydrocarbons obtained as by-products from the refining and cracking (e.g., naphtha cracking) of petroleum, for example, a $C_4$ fraction, a $C_4$ fraction after butadiene removal, a $C_5$ fraction, a $C_5$ fraction after isoprene removal, a $C_9$ fraction, and any mixtures of these fractions. Especially, fractions or the mixtures thereof containing a relatively large amount (e.g., 15% by weight or more) of unsaturated chain hydrocarbons and/or cyclic hydrocarbons having a vinylidene group or mixtures of these fractions the above-mentioned hydrocarbon content of which have been adjusted to 30% by weight or more based on the total amount of the polymerizable components.

Typical compositions of these fractions are as follows.

| Component | % by weight |
| --- | --- |
| (1) $C_4$ fraction: | |
| $C_3$—Hydrocarbons | 0 to 5 |
| Butenes | 35 to 65 |
| (for example, 1-butene, cis and trans 2-butene, isobutene, etc.) | |
| 1,3-Butadiene | 30 to 65 |
| $C_4$—Paraffins | 1 to 10 |
| (for example, n-butane, isobutane, etc.) | |
| (2) $C_4$ fraction after butadiene removal: | |
| $C_3$—Hydrocarbons | less than 3 |
| 1-Butene | 15 to 35 |
| cis and trans 2-Butene | 5 to 25 |
| Isobutene | 35 to 60 |
| 1,3-Butadiene | less than 2 |
| Isobutane and n-Butane | 3 to 20 |
| (3) $C_5$ fraction: | |
| $C_5$—olefins | |
| 1-pentene | 0.5 to 7 |
| 2-pentene (cis and trans) | 0.5 to 7 |
| Cyclopentene | 1 to 10 |

| Component | % by weight |
| --- | --- |
| 2-Methyl-1-butene | 2 to 15 |
| 2-Methyl-2-butene | 1 to 10 |
| 3-Methyl-1-butene | 0 to 3 |
| $C_5$—diolefins | |
| 1,3-pentadiene (cis and trans) | 4 to 20 |
| Isoprene | 4 to 20 |
| Cyclopentadiene | 0.5 to 15 |
| Dicyclopentadiene | 0.5 to 25 |
| $C_5$—paraffins | 5 to 50 |
| (for example, n-pentane or isopentane) | |
| $C_4$ to $C_6$ Hydrocarbon | 0 to 5 |
| (4) $C_5$ fraction after isoprene removal: | |
| $C_5$—olefins | |
| 1-pentene | 0 to 5 |
| 2-pentene (cis and trans) | 1 to 15 |
| Cyclopentene | 3 to 20 |
| 2-Methyl-1-butene | 0 to 5 |
| 2-Methyl-2-butene | 3 to 15 |
| 3-Methyl-1-butene | 0 to 5 |
| $C_5$—diolefins | |
| 1,3-pentadiene (cis and trans) | 15 to 50 |
| Isoprene | 0 to 5 |
| Cyclopentadiene | 0 to 10 |
| Dicyclopentadiene | 0 to 10 |
| $C_5$—paraffins | 5 to 50 |
| (for example, n-pentane or isopentane) | |
| $C_4$ to $C_6$ Hydrocarbon | 0 to 5 |
| (5) $C_9$ fraction: | |
| $C_8$ to $C_{12}$ aromatic vinyl hydrocarbons (Such as styrene, α-methyl styrene, indene, vinyl toluene, Methyl indene and β-methyl styrene) | |
| $C_9$ to $C_{12}$ Olefins | 1 to 15 |
| $C_9$ to $C_{12}$ diolefins | 0 to 5 |
| non-polymerizable aromatic hydrocarbons (Such as Benzene toluene xylene) | 15 to 50 |
| Paraffins and naphthens | 5 to 25 |

These fractions may contain a small amount of other unsaturated compounds as long as the above-mentioned unsaturated hydrocarbons are present as a major component. The increase in the amount of the other unsaturated compounds used tends to decrease the softening point of the resultant hydrocarbon resin. Accordingly, the amount of the other unsaturated compounds should be limited to such a range that the desired softening point of the hydrocarbon resins are preserved.

The 9,10-dihydrodicyclopentadiene and its derivatives usable as component (B) in the present invention are those having the following general formula:

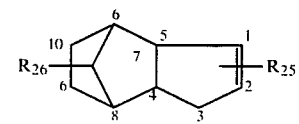
[VII]

wherein $R_{25}$ may be positioned at 1- or 2-position and is hydrogen, a halogen atom, a methyl group or a methoxy group and $R_{26}$ may be positioned at 3- to 10-position and is hydrogen, a halogen atom, a hydroxyl group, $-R_{27}$, $-OR_{28}$, $-R_{29}OR_{30}$, $-R_{31}OH$, $-COOR_{32}$, $-COR_{33}$,

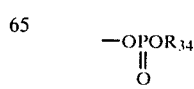

an isocyanate group or an aldehyde group, $R_{27}$, $R_{28}$, $R_{30}$, $R_{32}$, and $R_{33}$ are independently an alkyl group having 1 to 10 carbon atoms and an aryl or aralkyl group having 6 to 10 carbon atoms, $R_{29}$ and $R_{31}$ are independently an alkylene group having 1 to 10 carbon atoms, $R_{34}$ is hydrogen or an alkyl group having 1 to 10 carbon atoms or an aryl or aralkyl group having 6 to 10 carbon atoms. Examples of these compounds are 9-methyl-9,10-dihydrodicyclopentadiene, 3,9-dimethyl-9,10-dihydrodicyclopentadiene, 9 or 10-hydroxy-9,10-dihydrodicyclopentadiene, 9 or 10-methoxy-9,10-dihydrodicyclopentadiene, 9-acetyl-9,10-dihydrodicyclopentadiene, 9-phenoxy-9,10-dihydrodicyclopentadiene, 9-isocyanate-9,10-dihydrodicyclopentadiene, and bis(9,10-dihydrodicyclopentadienyl)phosphate. Of these compounds 9,10-dihydrodicyclopentadiene is most desirable.

The 9,10-dihydrodicyclopentadiene and its derivatives can be prepared, for example, as follows:

9,10-Dihydrodicyclopentadiene can be obtained by thermally treating cyclopentadiene contained in a $C_5$ fraction derived from, for example, a naphtha cracking process to form dicyclopentadiene, followed by the hydrogenation of a double-bond of a norbornene ring of dicyclopentadiene. The hydrogenation can be carried out by adding the predetermined molar ratio of hydrogen gas to dicyclopentadiene in the presence of one or more known hydrogenation catalysts at an ambient temperature or an elevated temperature under normal pressures or an elevated pressure by a conventional method. Examples of the hydrogenation catalysts are nickel, palladium, cobalt, platinum, ruthenium, rhodium, copper, the mixtures of these metals and the oxides of these metals.

The derivatives of 9,10-dihydrodicyclopentadiene can be prepared by thermally dimerizing derivatives of cyclopentadiene, followed by the partial hydrogenation of the dimerized product. Furthermore, the derivatives of 9,10-dihydrodicyclopentadiene can also be prepared by addition reacting alcohols, carboxylic acids, isocyanic acid, phosphoric acid or similar compounds to 9,10-dihydrodicyclopentadiene or its derivatives.

Of course, substantially pure 9,10-dihydrodicyclopentadiene and derivatives thereof are desirably used as component (B) in the present invention. However, component (B) may contain polymerizable components such as cyclopentene, the partially hydrogenated products of cyclopentadiene oligomers (trimer or more), and the partially hydrogenated products of isoprene-cyclopentadiene codimers and non-polymerizable components such as tetrahydrodicyclopentadiene and its derivatives, as long as at least about 60% by weight of 9,10-dihydrodicyclopentadiene or its derivatives are contained. However, contents of, for example, cyclopentadiene, dicyclopentadiene, and cyclopentadiene oligomers (trimer or more) and their derivatives are desirably 10% by weight or less based on the weight of the polymerization components, because the use of these components in too large amounts tend to worsen the color or hue of the resultant hydrocarbon resins and to form gel.

Of the above-mentioned unsaturated chain hydrocarbons, diolefins, desirably conjugated diolefins, more desirably 1,3-butadiene, isoprene, 1,3-pentadiene and 2,3-dimethyl-butadiene exhibiting small steric hindrance are preferably used as component (A) in the present invention because these compounds have a high copolymerizability with 9,10-dihydrodicyclopentadiene or its derivatives. Of the above-mentioned cyclic hydrocarbons containing a vinylidene group, those having the above-mentioned general formula (IV) wherein $R_{19}$ and $R_{20}$ are hydrogen, those having the above-mentioned general formula (V) wherein $R_{21}$ is hydrogen, or those having the above-mentioned general formula (VI) wherein $R_{22}$ is hydrogen and l is zero can also be preferably used as component (A) in the present invention because of the same reason as mentioned above. Typical examples of such cyclic hydrocarbons are 1,2-dimethylidene cyclohexane, vinylcyclohexene, vinylcyclohexane, vinyltoluene, and tert-butylvinyltoluene.

The catalysts used in the copolymerization of the copolymers of the present invention are those conventionally used in the homopolymerization and copolymerization of the above-mentioned various hydrocarbons. Examples of such catalysts are cationic catalysts, anionic catalysts, ionic coordination catalysts and radical catalysts.

The cationic catalysts usable in the present invention include those disclosed in, for example, Journal of Japan Petroleum Institute (Sekiyu Gakkai Shi), Vol. 16, No. 10, pp 865 to 867 (1973). Typical examples of such catalysts are $AlCl_3$, $AlBr_3$, $BF_3$, $SnCl_4$, $SbCl_5$, $FeCl_3$, $AlRCl_2$ (R: an alkyl group having 1 to 6 carbon atoms), $Al(C_2H_5)_3$—$H_2O$, $CCl_3COOH$ and $H_2SO_4$. Of these catalysts, Lewis acids, especially $AlCl_3$ and $AlBr_3$ are desirably used in the present invention because hydrocarbon resins having good color and a high softening point can be readily obtained at a high yield. Complexes of these Lewis acids with alcohols, phenols, esters, ethers, or alkyl halides can also be desirably used as catalysts.

The anionic catalysts usable in the present invention include the catalysts for homopolymerization and copolymerization of hydrocarbons, disclosed in, for example, Journal of Japan Petroleum Institute (Sekiyu Gakkai Shi), Vol. 16, No. 9, pp 779 to 784 (1973). Typical examples of such catalysts are K, KR, Na, NaR, Li, LiR, $SrZn(R)_6$, and $CuZn(R)_4$ wherein R is an alkyl group having 1 to 6 carbon atoms. Of these catalysts, Li and LiR are desirably used in the present invention because hydrocarbon resins having good color and a high softening point can be readily obtained at a high yield. These catalysts can be especially desirably used in the present invention when a carbonyl group is contained in the derivatives of 9,10-dihydrodicyclopentadiene.

The ionic coordination catalysts usable in the present invention include Ziegler catalysts disclosed in Journal of Japan Petroleum Institute (Sekiyu Gakkai Shi), vol. 16, No. 8, pp 699 to 704 (1973). Typical examples of such catalysts are combinations of the halides, $\beta$-diketone salts or alcolates of Ti, V, Cr and Zr with $Al(R)_3$, $Al(R)_nX_{3-n}$, LiR, MgRX, or LiH (wherein R is an alkyl group having 1 to 6 carbon atoms, X is a halogen atom and n is (or 2). Of these catalysts, combinations of the halides of Ti or V with an alkylaluminum compound are desirably used in the present invention because the reactivity of 9,10-dihydrodicyclopentadiene and its reactivities is increased.

The above-mentioned ionic coordination catalysts are especially desirably used in the present invention when the unsaturated chain hydrocarbons such as monoolefins (e.g., ethylene, propylene, butene-1, pentene-1, hexene-1 and 4-methylpentene-1) and conjugated diolefins (e.g., 1,3-butadiene, isoprene and 1,3-pentadiene) or when the derivatives of 9,10-dihydrodicyclopentadiene do not contain a hydroxyl group or a carbonyl group.

The radical catalysts usable in the present invention include those disclosed in Journal of Japan Petroleum Institute (Sekiyu Gakkai Shi), Vol. 16, No. 10, pp 867 to 871 (1973). Typical examples of such catalysts are peroxides such as benzoyl peroxide and tert-butyl hydroperoxide, azo compounds such as azobisisobutyronitrile and redox catalysts such as hydrogen peroxide—a ferrous compound and potassium persulfate-sodium sulfite. These radical catalysts are selected depending upon a polymerization temperature.

These radical catalysts are desirably used in the present invention when conjugated diolefins or styrene type compounds are used as component (A) or when the derivatives of 9,10-dihydrodicyclopentadiene contain a polar group such as a hydroxyl group. That is, the polymerization performance of the radical polymerization catalysts does not decrease even when the derivatives of 9,10-dihydrodicyclopentadiene contain a polar group.

The amount of these polymerization catalysts may be widely varied depending upon, for example, the kinds of the catalysts, the kinds and combinations of the co-monomers, the polymerization temperatures and the polymerization times. Generally speaking, the amounts of these catalysts are about 0.01 mol% to about 10 mol%, desirably 0.1% mol% to 5 mol%, based on the total amounts of the comonomers.

The copolymerization of the present invention can be carried out either in the presence of, or in the absence of, a polymerization solvent. The solvents usable, with all the above-mentioned catalysts, in the present invention include, for example, hydrocarbon solvents such as propane, butane, pentane, hexane, heptane, benzene, toluene, xylene and ethylbenzene. Furthermore, ethers such as diethylether, tetrahydrofuran, dioxane and 1,2-dimethoxyethane can be used for the anionic polymerization catalysts. Chlorinated solvents such as dichloromethane, ethylchloride, 1,2-dichloroethane and chlorobenzene can be used for the cationic polymerization catalysts. Water can be used for the radical polymerization catalysts when an emulsion or suspension polymerization method is used.

The copolymers of the present invention can be carried out in the presence of the above-mentioned catalyst under the conditions of a temperature of about minus several tens °C. to about 150° C., desirably 20° C. to 100° C. a pressure of normal pressures or an elevated pressure (e.g., 0 to 300 kg/cm$^2$G, desirably 0 to 50 kg/cm$^2$G) and a reaction time of about 0.5 hours to about 10 hours, desirably 1 hour to 8 hours.

In the copolymerization of the above-mentioned hydrocarbons (i.e., component (A)) and the 9,10-dihydrodicyclopentadiene or its derivatives (i.e., component (B)), component (B) is desirably used in an amount larger than stoichiometric amount thereof because the reactivity of 9,10-dihydrodicyclopentadiene or its derivatives is generally low. For instance, in order to obtain the copolymers according to the present invention containing about 20 mol% to about 98 mol% of a polymerization unit of component (A) and about 80 mol% to about 2 mol% of a polymerization unit of component (B), about 10 mol% to about 80 mol%, desirably 10 mol% to 60 mol%, of component (A) and about 90 mol% to about 20 mol%, desirably 90 mol% to 40 mol%, of component (B) are desirably used as starting comonomers in the copolymerization.

After the completion of the copolymerization, the remaining catalyst is treated or removed by any conventional manner and the unreacted monomers and the reaction solvent are separated from the desired copolymer by distillation or by adding the copolymerization mixture to a poor solvent for the copolymer. Thus, the desired hydrocarbon resin (i.e., copolymer) can be isolated.

The copolymers thus obtained contain about 20 mol% to about 98 mol%, desirably about 30 mol% to about 96 mol% and most desirably about 40 mol% to about 95 mol% of a polymerization unit of component (A) and about 80 mol% to about 2 mol%, desirably about 70 mol% to about 4 mol% and most desirably about 60 mol% to about 5 mol% of a polymerization unit of component (B). The copolymers generally have a softening point, determined by a Japanese Industrial Standard (JIS)-K-2531 ring and ball method, of about 60° C. to about 180° C., desirably about 80° C. to about 140° C., a melt viscosity, determined at a resin temperature of 200° C. by using a EMILA viscometer, of about 5 cps to about 10,000 cps, desirably about 10 cps to about 500 cps, a number-average molecular weight, determined by a GPC method (a polystyrene conversion method), of about 300 to about 15,000, desirably about 300 to about 3000, and most desirably about 400 to about 1000, a bromine number of about 2 to about 100 and a Gardner color scale of about 1 to about 12.

The copolymer having a polymerization unit of component (B) of less than 2 mol% does not exhibit a balanced workability (or processability) and characteristics satisfactory for use as a tackifier, an adhesive and an ingredient for a coating composition. This is because an attempt to decrease the melt viscosity of the copolymer causes the decrease in the softening point and because an attempt to increase the softening point of the copolymer causes the increase in the melt viscosity. Contrary to this, the copolymer having a polymerization unit of component (B) of more than 80 mol% has an undesirably low softening point, high Gardner scale and poor thermal stability. Furthermore, when an amount of a polymerization unit of component (B) in the copolymer is more than 80 mol%, the degree of polymerization cannot be increased and the polymerization yield is low due to the structure of 9,10-dihydrodicyclopentadiene. In order to increase the degree of polymerization, the use of the catalyst in an extremely high concentration is required. However this causes, in addition to the difficulty of the commercial production, the undesirable decreases in the softening point, the molecular weight, the undesirable increase in the Gardner color scale and the poor thermal stability of the resultant copolymer due to the fact that the increase in the molecular weight of the copolymer is difficult.

The copolymers having the ratio of the polymerization units of components (A) and (B) of within the above-mentiond range, especially the above-mentioned desirable range, are those having a relatively low melt viscosity as compared with the softening point, and also having an excellent color and thermal stability. Furthermore, the necessary amount of the catalyst is lower than that in the case of the homopolymerization of component (B). On the other hand, the copolymers having the ratio of the polymerization units of components (A) and (B) of other than the above-mentioned range have the characteristics inferior to those of the copolymers having to ratio of the polymerization units of components (A) and (B) of within the above-mentioned range. However, these copolymers still exhibit a relatively low melt viscosity in comparison with the softening point and an improved compatibility with other polymers, as compared with the similar polymers not containing the polymerization unit of component (B), i.e., 9,10-dihydrodicyclopentadiene and its derivatives.

The modified hydrocarbon resins of the present invention can be produced by modifying the above-mentioned copolymers by any conventional methods. For instance, the modification with an ethylenically unsaturated carboxylic acid or its derivatives as disclosed in, for example, U.S. Pat. No. 4,086,198 and Japanese Examined Patent Publication (Kokoku) No. 57-28429 and the modification with hydrogen as disclosed in, for example, U.S. Pat. No. 3,356,660.

The ethylenically unsaturated carboxylic acids or their derivatives usable in the modification of the above-mentioned copolymers of the present invention include, for example, $\alpha,\beta$-unsaturated carboxylic acids having 3 to 12 carbon atoms and their derivatives such as acrylic acid, methacrylic acid, maleic acid, fumaric acid, itaconic acid, citraconic acid, maleic anhydride, itaconic anhydride and citraconic anhydride, and Diels-Alder addition reaction products of conjugated dienes and an $\alpha,\beta$-unsaturated carboxylic acid or its anhydride such as 3,6-endomethylene-1,2,3,6-tetrahydrophthalic acid or its anhydride. In addition to these compounds, the esters or other derivatives of the ethylenically unsaturated carboxylic acids can also be used in the modification reaction. Of these ethylenically unsaturated carboxylic acids or their derivatives, $\alpha,\beta$-unsaturated dicarboxylic acids or their anhydrides, especially maleic acid or maleic anhydride, are desirably used in the modification reaction. These compounds can be used alone or in any mixtures thereof.

The modification reaction is generally carried out by addition reacting, for example, about 0.01 to about 50 parts by weight of an ethylenically unsaturated carboxylic acid or its derivative to 100 parts by weight of the above-mentioned copolymer of the present invention under heating. If the reaction temperature is desired to decrease or if the reaction time is desired to reduce, a conventional radical initiator may be used. If the unreacted ethylenically unsaturated carboxylic acid remains in a relatively large amount in the reaction mixture, the remaining ethylenically unsaturated carboxylic acid is desirably removed by, for example, concentration.

The acid-modified hydrocarbon resins thus obtained generally have an acid value of about 0.1 to about 150, desirably about 0.2 to about 20 and more desirably about 0.5 to about 15, a softening point of about 60° C. to about 180° C., desirably about 80° C. to about 140° C. a number-average molecular weight of about 300 to about 15000, desirably about 300 to about 3000, and most desirably about 400 to about 1000, a melt viscosity of about 5 to about 10,000, desirably about 10 to about 500, a bromine number of about 2 to about 100 and a Gardner color scale of about 1 to about 12.

These acid-modified hydrocarbon resins have the advantages, due to the increase in the affinity to pigments, that the flowability and coating film characteristics are improved in the case of being incorporated into coating compositions such as traffic paints and that the adhesive power and the cohesive power are improved in the case of being incorporated into adhesives.

The modification of the above-mentioned copolymers with hydrogen is generally carried out in the presence of an appropriate hydrogenation catalyst by using a solvent. The hydrogenation catalysts usable in the hydrogen-modification include, for example, metals belonging to groups VI and VIII of the Periodic Table or their compounds, such as nickel, chromium, paradium, platinum, cobalt, osmium, rhenium, ruthenium, a Raney nickel catalyst, nickel sulfide, nickel oxide, copper chromite, cobalt-molybdenum, molybdenum oxide, molybdenum sulfide, platinum oxide, cobalt oxide, rhenium oxide, ruthenium oxide, sponge iron, and iron oxide.

The reaction solvents usable in the modification of the above-mentioned copolymers with hydrogen include, for example, various aliphatic, alicyclic and aromatic solvents such as pentane, hexane, heptane, isoheptane, octane, isooctane, cyclohexane, methylcyclohexane, decalin, tetralin, benzene, toluene, xylene, and dioxane.

The hydrogenation reaction is usually carried out by continuously or batchwise treating the above-mentioned copolymers with a hydrogen gas at a temperature of from about 20° C. up to the thermal deterioration temperature of the copolymers, desirably about 100° C. to about 300° C., under a reduced pressure to an elevated pressure, usually an atmospheric pressure to about 300 kg/cm$^2$G, desirably about 10 to about 150 kg/cm$^2$G, for about 10 minutes to about 24 hours, desirably about 10 minutes to about 3 hours.

These hydrocarbon resins modified with hydrogen have a softening point of about 60° C. to about 180° C. desirably about 80° C. to about 140° C. a number-average molecular weight of about 300 to about 15,000, desirably about 300 to about 3000, most desirably about 400 to about 1000, a melt viscosity of about 5 to about 10,000, desirably about 10 to about 500, a bromine number of about 0 to about 20 and a Gardner color scale of about 5 or less, desirably about 1 or less. These modified hydrocarbon resins are particularly suitable for use as a tackifier for natural and various synthetic rubbers. Especially, since the modified hydrocarbon resins are of relatively light color and less odor, these resins are desirably used in the fields where these properties are required.

As mentioned hereinabove, the hydrocarbon resins and their modification products exhibit an excellent tack, adhesive power and cohesive power and, therefore, are useful as a tackifier for adhesives and coating compositions such as traffic paints.

The adhesives (e.g., pressure-sensitive adhesives and hot melt adhesives) containing as a tackifier the hydrocarbon resins or the modified products thereof according to the present invention will now be explained.

The reactive adhesives according to the present invention generally contain 100 parts by weight of a base polymer such as natural rubber, styrene-butadiene rubber, butyl rubber, isoprene rubber, styrene-butadiene-styrene block copolymer, styrene-isoprene-styrene block copolymer, acrylic resin, ethylene—a polar monomer copolymer (e.g., ethylene-vinyl acetate copolymer), ethylene-ethyl acrylate copolymer, epoxy resin, and urethane resin and about 20 to 200, parts by weight, desirably about 50 to 150 parts by weight, of the hydrocarbon resins and/or the modified products thereof, although the compounding ratio may be widely varied depending upon, for example, the intended use of the adhesives. In addition to the base polymer and the tackifier, a wax such as polyolefin wax and wax obtained by the thermal degradation of a high-molecular weight polyolefin, a plasticizer such as process oil, polybutene, dioctylphthalate (DOP) and dibutylphthalate (DBP), a filler such as calcium carbonate (CaCO$_3$), and zinc oxide (ZnO), a pigment such as zinc oxide (ZnO), titanium dioxide TiO$_2$), an antioxidant (or antiozonate) such as 2,6-di-tert.-butyl-p-cresol, 2,5-di-tert.-butylhydroquinone (DBH) and 2,2'-methylene-bis-(4-methyl-6-tert.-butyl phenol) (W-400), a stabilizer, such as trioctyl phosphate and epoxidized soy-beanoil can be optionally compounded into the adhesives. Furthermore, the hydrocarbon resins or the modified products thereof according to the present invention can be used as a tackifier together with conventional hydrocarbon resins.

The blending operation can be conducted in a conventional manner such as using a blending roll or in an appropriate solvent.

More particularly the pressure-sensitive adhesives or hot melt type adhesives of the present invention can be prepared using the following two approaches.

(1) Solvent Type

A base polymer is dissolved in a solvent and the resin of this invention along with optional components such as a tackifier resin (hydrocarbon resin), and, optionally, a plasticizer, a filler, an antioxidant, etc. are then added to the above solution followed by mixing at a temperature of room temperature to 50° C. for 5 to 25 hours. Suitable examples of solvents which can be used in this process are aromatic hydrocarbons such as benzene, toluene, xylene, etc., aliphatic hydrocarbons such as pentane, hexane, heptane, etc., halogenated aliphatic hydrocarbons such as trichlene, perclene, etc., and the like.

(2) Solvent-free Type

A composition containing the resin of this invention and a base polymer and optionally, a plasticizer, a filler, an antioxidant, etc. is mixed at a temperature of 80° C. to 200° C. for 0.5 to 3 hours using a Bumbury mixer, an open roll, etc.

In the compounding of the hydrocarbon resins or the modified products thereof according to the present invention with the base polymer and the other optional ingredients, since the hydrocarbon resins or the modified products thereof have a low melt viscosity, the necessary amount of the solvent used in the solution blend method can be reduced and the necessary energy used in the hot melt blend method can be reduced due to the reduction of the melt blend temperature and the melt blend time. Furthermore, when the hydrocarbon resins or the modified products thereof are compounded as a tackifier into reactive adhesives, the use of reactive or non-reactive type diluents is not necessary, as different from conventional adhesives due to the low viscosity of the hydrocarbon resins or the modified derivatives thereof.

The coating compositions containing the hydrocarbon resins or the modified products thereof according to the present invention will now be explained.

That is, the hydrocarbon resins or the modified products thereof can be compounded into coating compositions, together with, for example, an alkyd resin, a polyester resin, an epoxy resin, an urethane resin, an acrylic reisn, a urea resin, a melamine resin, and a phenol resin. Thus, coating compositions having a balanced workability and coated film characteristics can be obtained. Especially, the hydrocarbon resins or the modified products thereof can be advantageously compounded into traffic paints. The traffic paints containing the hydrocarbon resins or the modified products thereof according to the present invention have excellent characteristics such as low-melt viscosity (excellent fluidity), high compression strength, good weather ability, no substantial sedimentation of filler, as compared with conventional traffic paints.

The hot-melt type traffic paints containing the hydrocarbon resins or the modified products thereof further contains a pigment. The pigments usable in the present invention include any whitened and colored pigments such as, for example, calcium carbonate, titanium dioxide, zinc oxide, and siliceous sand. The pigments can be compounded into the traffic paints in an amount of about 25 to about 300 parts by weight, desirably about 35 to about 100 parts by weight, based on 100 parts by weight of the hydrocarbon resins or the modified products thereof.

The traffic paints can contain, in addition to the hydrocarbon resins or the modified products thereof according to the present invention, rosin or its derivatives and/or conventional petroleum hydrocarbon resins (e.g., resins having a softening point of 70° C. to 120° C. and a molecular weight of 500 to 1500 obtained by cationic polymerization of any fractions having a boiling point of −10° C. to 280° C. derived from cracking or refining petroleum in the presence of a Friedel-Crafts catalyst, aliphatic petroleum resins obtained by polymerizing C$_4$ and/or C$_5$ fractions or a fraction mainly containing 1,3-pentadiene, aromatic petroleum resins obtained by polymerizing a fraction mainly containing a C$_9$ fraction and resins obtained by copolymerizing C$_4$ and/or C$_5$ fractions with a C$_9$ fraction, as a thermoplastic resin. These thermoplastic resins other than the hydrocarbon resins and the modified products thereof according to the present invention can be compounded into traffic paints in an amount of about 10 to about 200 parts by weight based on 100 parts by weight of the hydrocarbon resins or the modified products thereof. Furthermore, the traffic paints can optionally contain a filler such as calcium carbonate, glass beads and cracked stone in an amount of about 50 to 700 parts by weight based on 100 parts by weight of the present hydrocarbon resins and the modified derivatives thereof. Still furthermore, the traffic paints can optionally contain a plasticizer such as animal and vegetable oils, mineral oils and synthetic oils (e.g., liquid paraffin, phthalates and castor oil), a lubricant, and waxes such as a polyolefin wax and thermally degraded waxes.

The present invention will now be further illustrated by, but is by no means limited to, the following examples, in which all parts and percentages are expressed on a weight basis unless otherwise specified.

REFERENCE EXAMPLE A

Twenty-five grams of a palladium-carbon catalyst (palladium content: 5%) and 2000 g of octane were added to 1710 g of a commercially available dicyclopentadiene (purity: 94.6%), and a hydrogen gas was passed through the mixture at a feed rate of 10 ml/min at an ambient temperature under normal pressures for 15 hours. The catalyst was removed from the mixture by filtration, and then, the resultant filtrate was distilled to obtain 1500 g of a fraction having a boiling point range of 180° C. to 184° C. The gas chromatograph analysis indicated that this fraction contained 84.5% of 9,10-dihydrodicyclopentadiene, 10.0% of tetrahydrodicyclopentadiene, 0.2% of unreacted dicyclopentadiene and 5.3% of unknown components.

REFERENCE EXAMPLE B

A $C_5$ fraction obtained from a naphtha cracking was heated at a temperature of 160° C. for 5 hours, whereby cyclopentadiene contained therein was converted into dicyclopentadiene. Then, the resultant mixture was distilled to strip a light fraction. Thus, a crude dicyclopentadiene containing 14.0% of a $C_5$ fraction, 2.6% of benzene, 69.1% of dicyclopentadiene, 7.3% of a isoprene-cyclopentadiene codimer, 4.7% of a cyclopentadiene oligomer (i.e., a trimer or more) and 2.3% of unknown components was obtained.

1710 g of the crude dicyclopentadiene obtained above was hydrogenated in the same manner as described in Reference Example A to obtain 1420 g of relatively viscous colorless transparent liquid. The gas chromatograph analysis indicated that the resultant product contained 71.2% of 9,10-dihydrodicyclopentadiene, 10.7% of tetrahydrodicyclopentadiene, 0.5% of unreacted dicyclopentadiene and 17.6% of unknown components.

REFERENCE EXAMPLE C

A $C_5$ fraction obtained from a naphtha cracking was heated at a temperature of 150° C. for 3 hours, whereby cyclopentadiene contained therein was converted into dicyclopentadiene. Then, the resultant mixture was distilled to strip a light fraction. Thus, a crude dicyclopentadiene containing 4.8% of a $C_5$ fraction, 0.5% of benzene 77.1% of dicyclopentadiene, 7.2% of isoprene-cyclopentadiene codimer, 8.2% of cyclopentadiene oligomer and 2.2% of unknown components was obtained.

100 parts (1710 g) of the crude dicyclopentadiene and 4 part of a palladium type hydrogenation catalyst in the form of tablets (C31-1A available from Toyo CCI Co.) were charged into a metallic autoclave and the hydrogenation reaction was carried out at a temperature of 50° C. under a hydrogen pressure of 10 kg/cm² for 12 hours while stirring. The catalyst was removed by filtration and the filtrate was distilled to obtain 90 parts of a 9,10-dihydrodicyclopentadiene component. The gas chromatograph analysis indicated that this fraction contained 19.0% of pentanes, 77.0% of 9,10-dihydrodicyclopentadiene, 0.1% or less of dicyclopentadiene, 0.8% of tetrahydrodicyclopentadiene and 3.2% of unknown components.

EXAMPLES 1 TO 12

The Catalysts listed in Table 1 and a portion (20 ml) of the solvent listed in Table 1 were charged into a 1 liter glass autoclave. Then, 9,10-dihydrodicyclopentadiene containing fractions obtained in Reference Examples A and B, diolefins and the remaining solvents were gradually added as a mixture by means of a pressure resistant cylinder to the contents of the autoclave while stirring. During the addition, the contents of the autoclave were maintained at a temperature of 60° C. by heating or by cooling. The addition of the comonomers was carried out for about 15 minutes. The polymerization was allowed to continue at this temperature for about 2 hours and, then, the catalysts were decomposed by the addition of methanol, and the resultant mixtures were washed with water. The polymerized oily products were filtered with a glass filter and determined the generation of gels. Thereafter, the filtrates were concentrated to form hydrocarbon resins.

The properties and characteristics of the resultant hydrocarbon resins are shown in Table 1 below.

TABLE 1

| | Example No. | | 1 | 2 | 3 | 4 | 5 | 6 |
|---|---|---|---|---|---|---|---|---|
| Copolymerization reaction | 9,10-Dihydrodicylopentadiene containing fraction | Reference Example | A | A | B | A | A | A |
| | | Used amount$^{(g)}$ | 70 | 81 | 96 | 70 | 70 | 81 |
| | Diolefin | Kind | 1,3-Pentadiene | 1,3-Pentadiene | 1,3-Pentadiene | Isoprene | Isoprene | 1,3-Butadiene |
| | | Used amount$^{(g)}$ | 30 | 9 | 9 | 30 | 30 | 7 |
| | Solvent | Kind | Xylene | Xylene-hexane | Xylene-hexane | Xylene | Xylene | Xylene-hexane |
| | | Used amount$^{(g)}$ | 108 | 62-31 | 62-16 | 108 | 108 | 10-81 |
| | Catalyst | Kind | AlCl$_3$ | AlCl$_3$ | AlCl$_3$ | AlCl$_3$ | EtAlCl$_2$ | AlCl$_3$ |
| | | Used amount$^{(g)}$ | 1.1 | 1.1 | 1.1 | 1.1 | 1.1 | 1.1 |
| | Gel generation amount (g) | | None | None | None | None | None | None |
| Hydrocarbon resin | Yield (g) | | 51 | 32 | 34 | 73 | 71 | 30 |
| | Dihydrodicyclopentadiene unit (mol %) | | 33 | 50 | 48 | 37 | 40 | 51 |
| | Softening point (JIS-K-2531 ring and ball method) (°C.) | | 89 | 95 | 97 | 96 | 96 | 96 |
| Resin characteristics | Color (JIS-K-5400 Gardner color scale) | | 7 | 7 | 7 | 5 | 4 | 7 |
| | Melt viscosity (EMILA viscometer, 200° C.) (cps) | | 125 | 90 | 90 | 85 | 85 | 90 |
| | Number-average molecular weight | | 420 | 450 | 460 | 455 | 460 | 420 |
| Compatibility | Ethylene-Vinylacetate copolymer (Vinylacetate 19 wt %) | | o | o | o | o | o | o |
| | Ethylene-Vinylacetate copolymer (Vinylacetate 28 wt %) | | o | o | o | o | o | o |
| | Natural rubber | | o | o | o | o | o | o |
| | Modified rosin | | o | o | o | o | o | o |
| Heat resistance | | | 10 | 10 | 10 | 8 | 7 | 10 |

| | Example No. | | 7 | 8 | 9 | 10 | 11 |
|---|---|---|---|---|---|---|---|
| Copolymerization reaction | 9,10-Dihydrodicyclopentadiene containing fraction | Reference Example | A | A | A | A | A |
| | | Used | 81 | 81 | 81 | 81 | 51 |

TABLE 1-continued

| | | | | | | |
|---|---|---|---|---|---|---|
| Diolefin | Kind | 1,4-Pentadiene | 1,3-Butadiene | 1,3-Pentadiene | Isoprene | Isoprene |
| | Used amount$^{(g)}$ | 9 | 7 | 9 | 9 | 22 |
| Solvent | Kind | Hexane | Hexane | Hexane | Hexane | Hexane |
| | Used amount$^{(g)}$ | 93 | 91 | 93 | 93 | 93 |
| Catalyst | Kind | AlCl$_3$ | AlCl$_3$ | AlCl$_3$ | AlCl$_3$ | AlCl$_3$ |
| | Used amount$^{(g)}$ | 1.1 | 1.1 | 1.1 | 1.1 | 1.1 |
| Gel generation amount (g) | | None | None | 1 | 3 | 1 |
| Hydrocarbon resin | Yield (g) | 12 | 22 | 21 | 24 | 43 |
| | Dihydrodicyclopentadiene unit (mol %) | 48 | 48 | 55 | 55 | 25 |
| | Softening point (JIS-K-2531 ring and ball method) (°C.) | 101 | 141 | 128 | 138 | 160 |
| Resin characteristics | Color (JIS-K-5400 Gardner color scale) | 8 | 7 | 7 | 5 | 6 |
| | Melt viscosity (EMILA viscometer, 200° C.) (cps) | 140 | 1000 | 570 | 950 | 8300 |
| | Number-average molecular weight | 470 | 525 | 480 | 510 | 650 |
| Compatibility | Ethylene-Vinylacetate copolymer (Vinylacetate 19 wt %) | o | o | o | o | o |
| | Ethylene-Vinylacetate copolymer (Vinylacetate 28 wt %) | o | Δ | o | Δ | Δ |
| | Natural rubber | o | o | o | o | Δ |
| | Modified rosin | o | o | o | o | Δ |
| Heat resistance | | 11 | 10 | 10 | 8 | 9 |

Test method (1) compatibility:
o ... Transparent
Δ ... Translucent
x ... Opaque (A) Ethylene-vinylacetate copolymer, Evaflex 410 (vinylacetate content: 19 wt%) or Evaflex 210 (vinylacetate content: 28 wt%), manufactured by Mitsui Polychemical Co., Ltd. was mixed with the hydrocarbon resins in equal amounts on a hot plate having a temperature of 180° C., and the resultant mixture was coated on a polyester film so as to form a coating having a thickness of about 1 mm. The transparency of the coating thus obtained was visually evaluated.

(A') The compatibility of bisphenol A type epoxy resin, Epomik R-304 (epoxy equivalent: about 500) or Epomik R-309 (epoxy equivalent: about 3000), manufactured by Mitsui Petrochemical Epoxy Co., Ltd. with the hydrocarbonresin was evaluated in the same manner as in the above-mentioned (A).

(B) The hydrocarbon resin was dissolved in a 10% toluene solution of natural rubber in the same amount as natural rubber in the solution, and the solution thus obtained was coated on a polyester film so as to form a coating having a thickness of about 80 μm. The transparency of the coating thus obtained was visually evaluated.

(C) Commercially available modified rosin for a traffic paint (maleate type: softening point 94° C., acid value 24 and melt viscosity 150 cps) and the hydrocarbon resin were charged into a test tube in equal amounts and dissolved and mixed in an oil bath having a temperature of 180° C. The transparency of the mixture after cooling to a room temperature was visually evaluated.

(2) Heat resistance:

2.5 g of the hydrocarbon resin was placed in a test tube having an inner diameter of 15 mm and a length of 18 mm and was heated on an oil bath having a temperature of 200° C. for 3 hours. The color was determined according to a Gardner method.

(3) Content of 9,10-dihydrodicyclopentadiene polymerization unit in the hydrocarbon resin:

The compositions of the starting mixture prior to the copolymerization and the oily polymerization product after the copolymerization were determined by a gas chromatograph analysis. The content of 9,10-dihydrodicyclopentadiene was calculated from the reaction amounts of the comonomers.

COMPARATIVE EXAMPLES 1 TO 4

Homopolymerization of 9,10-dihydrodicyclopentadiene containing fraction and isprene, and copolymerization of 9,10-dihydrodicyclopentadiene containing fraction and dicyclopentadiene were carried out in the same manner as in Examples 1 to 12.

The properties and characteristics of the resultant hydrocarbon resins are shown in Table 2.

As should be clear from the results shown in Table 2, the polymerizability of 9,10-dihydrodicyclopentadiene alone is very low and the resultant hydrocarbon resins has a low softening point, poor color and heat resistance. Furthermore, the copolymer thereof with dicyclopentadiene has extremely poor color and heat resistance.

As should be clear from the above results, the yield of the resultant hydrocarbon resin was larger than that of Example 1. Furthermore, the content of 9,10-dihydrodicyclopentadiene polymerization unit in the hydrocarbon resin is increased and the melt viscosity of the hydrocarbon resin is decreased, as compared with the case of Example 1.

EXAMPLES 14 TO 16 AND COMPARATIVE

TABLE 2

|  |  |  |  | Comparative Example | | | |
|---|---|---|---|---|---|---|---|
|  |  |  |  | 1 | 2 | 3 | 4 *2 |
| (Co)polymerization | 9,10-Dihydrodicyclopentadiene containing fraction | Reference Example Used amount (g) | | A 101 | A 101 | — — | A 81 |
|  | Diolefin | Kind | | — | — | Isoprene | Dicyclopentadiene |
|  |  | Used amount (g) | | — | — | 101 | 17 |
|  | Solvent | Kind | | Xylene | Hexane | Xylene | Xylene |
|  |  | Used amount (g) | | 100 | 100 | 132 | 103 |
|  | Catalyst | Kind | | $AlCl_3$ | $AlCl_3$ | $AlCl_3$ | $AlCl_3$ |
|  |  | Used amount (g) | | 1.1 | 1.1 | 1.1 | 1.1 |
| Gel generation amount (g) | | | | None | None | | 3 |
| Hydrocarbon resin | Yield (g) | | | 7 | 2 | | 25 |
|  | Dihydrodicyclopentadiene unit (mol %) | | | 100 | 100 | Substantially all comonomers were gelled. | 40 |
| Resin characteristics | Softening point (°C.) | | | Liquid (30) | Liquid | | 108 |
|  | Gardner color scale | | | 12 | *1 | | 16 |
| Heat resistance | | | | 18 | *1 | | more than 18 |

*1 Although the determination was impossible due to the formation amount being small, the Gardner color scale seemed to be about 12 from visual appearance (red).
*2 Melt viscosity of the hydrocarbon resin was 1500 cps.

EXAMPLE 13

In Example 1, a mixture of 9,10-dihydrodicyclopentadiene containing fraction and the remaining solvent was added, while stirring, for 5 minutes to a 1 liter glass autoclave containing the predetermined amount of the catalyst and a portion (20 ml) of the solvent, and then, the 1,3-pentadiene was gradually added thereto for 1.5 hours while the temperature was maintained at 60° C. The copolymerization mixture was allowed to react for further 25 minutes at a temperature of 60° C.

The results are shown in Table 3 below.

TABLE 3

| Gel formation | None |
|---|---|
| Hydrocarbon resin | |
| Yield | 62 g |
| Dihydrodicyclopentadiene unit | 41 mol % |
| Resin characteristics | |
| Softening point | 88° C. |
| Color (Gardner color scale) | 7 |
| Melt viscosity | 75 cps |
| Number-average molecular weight | 420 |

EXAMPLE 8

A $C_5$ fraction having the composition listed in Table 4 below was copolymerized with the 9,10-dihydrodicyclopentadiene containing fraction obtained in Reference Example A.

TABLE 4

| Components | % by weight |
|---|---|
| Butenes | 1.0 |
| Butadiene | 1.0 |
| Chain $C_5$ monoolefin | 14.6 |
| Cyclopentene | 4.3 |
| Isoprene | 7.4 |
| 1,3-Pentadiene | 13.2 |
| 1,4-Pentadiene | 2.2 |
| Cyclopentadiene | 1.2 |
| Dicyclopentadiene | 1.1 |
| (Total Polymerizable components) | (46.0) |
| $C_4$–$C_6$ Non-polymerizable components | 54.0 |

The results of the resultant hydrocarbon resins are shown in Table 5.

TABLE 5

|  |  |  | No. | | | |
|---|---|---|---|---|---|---|
|  |  |  | Example 14 | Example 15 | Example 16 | Comparative Example 5 |
| Copolymerization | 9,10-Dihydrodicyclopentadiene containing fraction | Reference Example | A | A | A | — |
|  |  | Used amount (g) | 94 | 59 | 24 | 0 |
|  | $C_5$ Fraction (see Table 4) | Used amount (g) | 44 | 109 | 174 | 217 |
|  | Solvent | Kind | Hexane–Xylene | Hexane–Xylene | Hexane–Xylene | Xylene |
|  |  | Used amount (g) | 80–15 | 50–15 | 20–15 | 15 |
|  | Catalsyt | Kind | $AlCl_3$ | $AlCl_3$ | $AlCl_3$ | $AlCl_3$ |
|  |  | Used | 1.3 | 1.3 | 1.3 | 1.3 |

TABLE 5-continued

|  |  | Example 14 | Example 15 | Example 16 | Comparative Example 5 |
|---|---|---|---|---|---|
|  | amount (g) |  |  |  |  |
| Gel formation amount (g) |  | None | None | None | None |
| Hydrocarbon resin | Yield (g) | 28 | 39 | 57 | 53 |
|  | Dihydrodicyclopentadiene unit (mol %) | 39 | 12 | 7.6 | 0 |
| Resin characteristics | Softening point (JIS-K-2531, ring and ball method) (°C.) | 92 | 98 | 97 | 99 |
|  | Color (JIS-K-5400, Gardner color scale) | 7 | 7 | 7 | 7 |
|  | Melt viscosity (EMILA, 200° C.) (cps) | 58 | 125 | 170 | 210 |
|  | Number-average molecular weight | 640 | 650 | 1000 | 1320 |
| Compatibility | Ethylene-Vinylacetate copolymer |  |  |  |  |
|  | (VAc 19 wt %) | o | o | o | x |
|  | (VAc 28 wt %) | o | o | Δ | x |
|  | Natural rubber | o | o | o | o |
|  | Modified rosin | o | o | Δ | Δ |

EXAMPLE 17 AND COMPARATIVE EXAMPLES 6 AND 7

0.5 parts of maleic anhydride was added to 100 parts of the hydrocarbon resins obtained in Example 3, and the mixture was then reacted at a temperature of 200° C. at 2 hours. Thus, maleated hydrocarbon resins having a softening point of 99° C., a Gardner color scale of 7 and an acid value of 2.0 were obtained.

To 100 parts of the maleated hydrocarbon resin, 12 parts of a plasticizer (Tokushinol TS-110 available from Tokushima Seiyu Co.), 200 parts of coarse calcium carbonate grain (Kansui #30 available from Nitto Funka Co.), 200 parts of fine calcium carbonate powder (Whiten H available from Shiraishi Calcium Co.), 66 parts of titanium dioxide (Tipaque A-220 available from Ishihara Sangyo Co.) and 100 parts of glass beads (GB-153T available from Toshiba Ballatini Co.) were added, and the mixture was melt blended on an oil bath at a temperature of 200° C. Thus, a traffic paint composition was prepared. The properties and characteristics of the traffic paint composition thus obtained are shown in Table 6 below.

As comparative examples, the physical properties and characteristics, a commercially available petroleum type traffic paint (Comparative Example 6) and modified rosin type traffic paint (Comparative Example 7) are also shown in Table 6.

As should be clear from the results shown in Table 7, the traffic paint compositions containing the maleated hydrocarbon resins according to the present invention have low viscosity, and therefore, excellent workability, and also have a high compression strength, no sedimentation property of the filler and good weatherability. The excellent performance of these traffic paint composition cannot be seen in conventional traffic paints.

TABLE 6

| Item | Example 17 | Comparative Examples 6 | 7 |
|---|---|---|---|
| Softening point (°C.) | 107 | 104 | 106 |
| Melt viscosity (cps) |  |  |  |
| 200° C. | 2350 | 3600 | 4100 |
| 180° C. | 4750 | 6700 | 8500 |
| Fluidity (mm) | 60 | 60 | 57 |
| Compression strength (kg/cm²) | 552 | 285 | 320 |
| Filler sedimentation (%) | None | 15 | None |
| Whiteness of coating film | 89 | 89 | 86 |
| Whiteness after accelerated deterioration | 90 | 89 | 83 |
| Hair crack | A | C | B |

Test method

1. Softening point: Determined according to a JIS-K-5665 method
2. Melt viscosity: Determined by using a molten composition at 200° C. by means of EMILA type rotational viscometer at a shear rate of 176/sec.
3. Fluidity: A molten composition at 200° C. was stirred and a portion thereof was rapidly taken with a metallic laddle having a diameter of 31 mm and a depth of 24 mm and was flown down on a flat aluminum plate from a 30 mm height. The long and short diameter of the cured coating film in the form of circular- or round-like shape were measured and the average diameter was defined as fluidity (mm).
4. Compression strength: Determined according to a JIS-K-5665 method
5. Filler sedimentation (%): Unmelted composition was filled to a 50 ml beaker and was allowed to stand at a temperature of 240° C. for 2 hours. Thereafter, the composition was cooled and was cured. The sedimentation percent of the filler in the vertical cut surface of the cured product.
6. Whiteness of coating film: a test specimen was prepared according to a JIS-K-5665-5 and -6 method and the values L, a, and b thereof were determined by means of a color studio. From these values, the whiteness W was calculated from the following equation.

$$W = 100 - [(100-L)^2 + a^2 + b^2]^{\frac{1}{2}}$$

7. Whiteness after accelerated deterioration and hair crack:

The test specimen used in the determination of the whiteness of coating film was subjected to an accelerated deterioration for 100 hours by means of a sunshine weatherometer. Thereafter, whiteness was determined in the same manner as mentioned above and the value obtained was defined as whiteness after accelerated deterioration.

The surface appearance of the test specimen was visually observed and the degree of hair crack was evaluated according to the following determination standards:
- A: No change was observed.
- B: Slight hair crack was observed.
- C: Hair crack was grown and was clearly observed.
- D: Hair crack was grown and was reached to the panel.

EXAMPLES 18 TO 19 AND COMPARATIVE EXAMPLE 8

Adhesive compositions were prepared by using the hydrocarbon resin obtained in Example 3 (i.e., Example 18), the maleated hydrocarbon resin obtained in Example 17 (i.e., Example 19) and commercially available resin (Wing tack plus available from Goodyear Co.). The physical properties and characteristics of the adhesives thus prepared were evaluated.

The results are shown in Table 7. As should be clear from the results shown in Table 7, both the hydrocarbon resin and the maleated hydrocarbon resin according to the present invention have excellent tack and adhesive power superior to those of the commercially available resin. (Wing tack plus available from Goodyear Co.). The physical properties and characteristics of the adhesives thus prepared were evaluated.

The results are shown in Table 7. As should be clear from the results shown in Table 7, both the hydrocarbon resin and the maleated hydrocarbon resin according to the present invention have excellent tack and adhesive power superior to those of the commercially available resin.

TABLE 7

| Item | Example 18 | Example 19 | Comparative Example 8 |
|---|---|---|---|
| Tack (ball No.) | 16 | 17 | 12 |
| Adhesive force (g/25 mm) | 3100 | 3370 | 2600 |
| Cohesive force (mm/2 hr) | 0.1 | 0.1 | 0.1 |

Evaluation method

An adhesive composition was prepared by blending 100 parts of a starting hydrocarbon resin obtained in Example 18 or 19, or Comparative Example 8, with 100 parts of a commercially available SIS type block copolymer, Califlex TR-1107 (Shell Chemie), 30 parts of a mineral oil, Shellflex 371 N (Shell Oil Co.) and 3 parts of a stabilizer, Irganox 1010 (Chiba Geigy) and the mixture was kneaded at a temperature of 150° C. for 30 minutes by using a kneader.

The adhesive composition thus obtained was coated onto a polyester film (Lumorror available from Toray Industries Inc., thickness 25 μm) by means of a hot-melt type applicator so as to form a coating film having a thickness of 55 μm. With regard to the sample thus obtained, tack was determined at 20° C. according to a J. Dow Rolling Ball method and both adhesive force and cohesive force were determined according to a JIS -Z-1522 method.

EXAMPLE 20

142 g of 9,10-dihydrodicyclopentadiene containing fraction obtained in Reference Example B was charged into a 1 liter four-necked flask provided with a stirrer, a thermometer, a cooler, a dropping funnel and a catalyst feed nozzle with a rubber stopper. Then, 2.5 g of a boron trifluoride-phenol complex was added to the flask while stirring under a nitrogen atmosphere. The mixture was gradually heated to a temperature of 40° C. Then, 205 g of naphtha cracking oil having a boiling temperature range of 140° C. to 230° C. and having the composition listed in Table 8 below was dropwise added to the flask for 2 hours. After the addition, the mixture was allowed to react for 30 minutes, while the reaction temperature was maintained to a temperature of 40° C. to 45° C. Then, the catalyst was decomposed with an aqueous sodium hydroxide and was washed with water. The resultant mixture was concentrated to obtain 126 g of a hydrocarbon resin.

TABLE 8

| Compositions | % by weight |
|---|---|
| Styrene | 7.3 |
| α-methylstyrene | 2.3 |
| Vinyltoluene | 12.9 |
| Dicyclopentadiene | 0.8 |
| Indene | 12.2 |
| Methylindene | 5.6 |
| other polymerizable components | 8.1 |
| (Total polymerizable components) | (49.2) |
| Non-polymerizable components | 50.8 |

EXAMPLE 21

Copolymerization was carried out in the same manner as in Example 20, except that 101 g of 9,10-dihydrodicyclopentadiencyl phenyl ether (prepared from dicyclopentadiene and phenol according to a method disclosed in Bulletin of the Chemical Society of Japan, Vol. 50, pp 2203,1973) was used, in lieu of 9,10-dihydrodicyclopentadiene containing fraction. Thus, 120 g of a hydrocarbon resin was obtained. The characteristics of the resultant resin are shown in Table 9 below.

COMPARATIVE EXAMPLE 9

2.2 g of boron trifluoride-phenol complex was dropwise added to 290 g of the nephtha cracking oil used in Examples 20 and 21. The mixture was reacted at a temperature of 40° C. to 45° C. for 2.5 hours. Thus, 135 g of a hydrocarbon resin was obtained. The characteristics of the resultant resin are shown in Table 9.

TABLE 9

| Item | Example 20 | Example 21 | Comparative Example 9 |
|---|---|---|---|
| Dihydrodicyclopentadiene unit in the hydrocarbon resin (mol %) | 24 | 20 | 0 |
| Softening point (°C.) | 120 | 117 | 125 |
| Gardner color scale | 8 | 8 | 10 |
| Melt viscosity (cps) | 85 | 70 | 420 |
| Number-average molecular weight | 530 | 510 | 820 |
| Compatibility | | | |
| Ethylene-vinylacetate (VAc: 19 wt %) | o | o | x |
| Ethylene-vinylacetate (VAc: 28 wt %) | o | o | Δ |
| Natural rubber | o | o | x |
| Modified rosin | o | o | Δ |

EXAMPLES 22 TO 24 AND COMPARATIVE EXAMPLE 10

The 9,10-dihydrodicyclopentadiene containing fraction obtained in Reference Example C was copolymerized with a C5 fraction having the composition listed in Table 10 (1,3-pentadiene-rich fraction obtained after removing isoprene, pentane and cyclopentadiene from a naphtha cracking C5 fraction). The results are shown in Table 11 below.

TABLE 10

| Composition | % by weight |
|---|---|
| Butenes | 0.1 |
| Cyclic C5 monoolefins | 13.1 |
| Cyclopentene | 12.6 |
| Isoprene | 0.2 |
| 1,3-Pentadiene | 41.9 |
| Cyclopentadiene | 1.2 |
| Dicyclopentadiene | 0.1 |
| (Total Polymerizable components) | (69.2) |
| C4-C6 Non-polymerizable components | 30.8 |

EXAMPLE 29

2.5 parts of maleic anhydride and 1 part of di-tert-butylperoxide were added to 100 parts of the hydrocarbon resin obtained in Example 22. The mixture was stirred in a molten state at a temperature of 180° C. for 5 hours, and then, low boiling point products were removed under a reduced pressure. Thus, 102 parts of maleated hydrocarbon resin was obtained.

A traffic paint composition was prepared in the same manner as described in Example 17. The characteristics of the traffic paint composition are shown in Table 12.

TABLE 12

| | | Example 25 | Example 26 | Example 27 | Example 28 | Comparative Example 11 | Comparative Example 12 | Example 29 |
|---|---|---|---|---|---|---|---|---|
| Modified hydrocarbon resin | Starting hydrocarbon resin | Example 15 | Example 22 | Example 23 | Example 24 | Comparative Example 5 | Comparative Example 10 | Example 22 |
| | Modifying α,β-unsaturated carboxylic acid | Maleic acid | Itaconic acid | Itaconic anhydride | Citraconic acid | Maleic anhydride | Maleic acid | Maleic anhydride |
| | Softening point (°C.) | 98 | 94 | 99 | 96 | 96.5 | 96 | 97.5 |
| | Gardner color scale | 7 | 5 | 5 | 7 | 7 | 6 | 5-6 |
| | Acid value | 2.2 | 0.6 | 1.5 | 5.5 | 2.4 | 2.2 | 11.5 |
| | Softening point (°C.) | 106 | 103 | 107 | 106 | 104 | 105 | 108 |
| | Melt viscosity (cps) 200° C. | 2500 | 2100 | 3300 | 2000 | 3600 | 4250 | 2400 |
| | Melt viscosity (cps) 180° C. | 5000 | 3650 | 5120 | 3400 | 7500 | 8300 | 4900 |
| Traffic paint | Fluidity (mm) | 68 | 68 | 67 | 69 | 67 | 62 | 68 |
| | Compression strength (kg/cm$^2$) | 430 | 407 | 375 | 490 | 310 | 320 | 445 |
| | Filler sedimentation (%) | None | None | 5-10 | None | None | 10-15 | 5-10 |
| | Coating whiteness | 89 | 90 | 90 | 89 | 90 | 89 | 89 |
| | Acceleration whiteness | 90 | 90 | 90 | 89 | 89 | 89 | 90 |
| | Hair crack | A | A | A | A | B | B | A |

EXAMPLES 30 TO 33 AND COMPARATIVE

TABLE 11

| | | | No. | | | |
|---|---|---|---|---|---|---|
| | | | Example 22 | Example 23 | Example 24 | Comparative Example 10 |
| Copolymerization reaction | 9,10-Dihydrodicyclopentadiene containing fraction | Reference Example No. | C | C | C | — |
| | | Used amount (g) | 97 | 37.5 | 112.5 | 0 |
| | C5 fraction (Table 10) | Used amount (g) | 108 | 112.5 | 37.5 | 217 |
| | Solvent | Kind | Xylene | Xylene | Xylene-hexane | Xylene-hexane |
| | | Used amount (g) | 115 | 154 | 98-42 | 62-62 |
| | Catalyst | Kind | AlCl$_3$ | AlCl$_3$ | AlCl$_3$ | AlCl$_3$ |
| | | Used amount (g) | 1.0 | 0.8 | 20 | 2.0 |
| Gel formation amount (g) | | | None | None | None | 0.2 |
| Hydrocarbon resin | Yield (g) | | 101 | 61 | 100 | 123 |
| | Dihydrodicyclopentadiene unit (mol %) | | 8.3 | 7.1 | 18.3 | 0 |
| Resin characteristics | Softening point (JIS-K-2531, ring and ball method) (°C.) | | 93 | 99 | 93 | 95 |
| | Color (JIS-K-5400, Gardner method) | | 5 | 5 | 6 | 6 |
| | Melt viscosity (EMILA viscometer, 200° C.) (cps) | | 90 | 100 | 125 | 240 |
| | Number-average molecular weight | | 750 | 560 | 920 | 1560 |
| Compatibility | Ethylene-vinylacetate copolymer (VAc 19%) | | o | o | o | o |
| | Ethylene-vinylacetate copolymer (VAc 28%) | | o | o | o | Δ |
| | Natural rubber | | o | o | o | o |
| | Modified rosin | | o | o | o | Δ |

EXAMPLES 25 TO 28 AND COMPARATIVE EXAMPLES 11 AND 12

The hydrocarbon resins obtained in Example 15 and 22 to 24 and Comparative Examples 5 and 10 were modified with α,β-unsaturated carboxylic acids or the anhydrides thereof in the same manner as described in Example 17 to form the corresponding modified products of the hydrocarbon resins.

Traffic paint compositions were prepared from the modified hydrocarbon resins obtained above. The characteristics of the traffic paint compositions are shown in Table 12 below.

EXAMPLES 13 AND 14

Adhesive compositions were prepared by using the hydrocarbon resins obtained in Examples 15 and 22 to 24 and Comparative Examples 5 and 10 in the same manner as described in Example 18.

The characteristics of the adhesive tapes prepared from the resultant compositions are shown in Table 13 below.

EXAMPLES 34 TO 38 AND COMPARATIVE EXAMPLES 15 AND 16

Adhesive compositions were prepared by using as tackifiers the modified hydrocarbon resins obtained in Examples 25 to 29 and Comparative Examples 11 and 12. The characteristics of the adhesive tapes prepared from the resultant compositions are shown in Table 14 below.

TABLE 13

| | | No. | | | | | |
|---|---|---|---|---|---|---|---|
| | | Example 30 | Example 31 | Example 32 | Example 33 | Comparative Example 13 | Comparative Example 14 |
| Hydrocarbon resin | | Example 15 | Example 22 | Example 23 | Example 24 | Comparative Example 5 | Comparative Example 9 |
| Characteristics of adhesive tape | Tack (Ball No.) | 16 | 18 | 16 | 19 | less than 2 | 6 |
| | Adhesive force (g/25 mm) | 2950 | 2800 | 2910 | 3050 | 2500 | 2200 |
| | Cohesive force (mm/2 hr) | 0.1 | 0.1 | 0.2 | 0.2 | 0.1 | 0.2 |

TABLE 14

| | | No. | | | | | |
|---|---|---|---|---|---|---|---|
| | | Example 34 | Example 35 | Example 36 | Example 37 | Example 38 | Comparative Example 15 | Comparative Example 16 |
| Modified hydrocarbon resin | | Example 25 | Example 26 | Example 27 | Example 28 | Example 29 | Comparative Example 11 | Comparative Example 12 |
| Characteristics of adhesive tape | Tack (Ball No.) | 15 | 17 | 16 | 18 | 15 | less than 2 | 5 |
| | Adhesive force (g/25 mm) | 3030 | 2870 | 3040 | 3140 | 2850 | 2420 | 2100 |
| | Cohesive force (mm/2 hr) | 0.1 | 0.1 | 0.1 | 0.1 | 0.1 | 0.2 | 0.2 |

EXAMPLES 39 AND 40

The 9,10-dihydrodicyclopentadiene containing fraction obtained in Reference Example C was copolymerized with the C$_5$ fraction having the composition listed in Table 10 and styrene (or α-methyl styrene) in the same manner as described in Example 1 to 12.

The results are shown in Table 15 below.

EXAMPLES 41 AND 42 AND COMPARATIVE EXAMPLE 17

The monomers and solvent listed in Table 16 below were charged to a one liter four-necked flask provided with a thermometer, a stirrer, a condenser and a dropping funnel and the content of the flask is replaced with nitrogen. Three grams of di-tert-butyl peroxide was added to the flask through the dropping funnel while the solvent was refluxed upon heating. The reflux was then continued for 20 hours. Thereafter, the polymerization mixture was concentrated at a temperature of 210° C. under a pressure of 10 mmHg to obtain a hydrocarbon resin.

The results are shown in Table 16. An infrared spectrography indicated that the hydrocarbon resin of Example 42 had an absorption of 3300 to 3600 cm$^{-1}$ due to the presence of a hydroxy group.

TABLE 15

| | | Example No. | 39 | 40 |
|---|---|---|---|---|
| Copolymerization reaction | 9,10-Dihydrodicyclopentadiene containing fraction | Reference styrene used amount$^{(g)}$ | C 175 | C 175 |
| | C$_5$ fraction | used | 130 | 130 |
| | (Table 10) styrene | amount$^{(g)}$ kind used amount$^{(g)}$ | Styrene 25 | Methyl styrene 25 |
| | Solvent | Kind Used amount$^{(g)}$ | Xylene 30 | Xylene 30 |
| | Catalyst | Kind Used amount$^{(g)}$ | AlCl$_3$ 1.7 | AlCl$_3$ 1.7 |
| | Gel generation amount (g) | | None | None |
| Hydrocarbon resin | Yield (g) | | 127 | 118 |
| | Dihydrodicyclopentadiene unit (mol %) | | 12.8 | 10.5 |
| Resin characteristics | Softening point (JIS-K-2531) ring and ball method) (°C.) | | 80 | 82 |
| | Color (JIS-K-5400 Gardner color scale) | | 5 | 6 |
| | Melt viscosity (EMILA viscometer, 200° C.) (cps) | | 40 | 40 |
| | Number-average molecular weight | | 600 | 610 |
| Compatibility | Ethylene-Vinylacetate copolymer (Vinylacetate 19 wt %) | | o | o |
| | Ethylene-Vinylacetate copolymer (Vinylacetate 28 wt %) | | o | o |
| | Natural rubber | | o | o |
| | Modified rosin | | o | o |
| Heat resistance | | | 8 | 8 |

TABLE 16

| | Example No. | | Example 41 | Example 42 | Comparative Example 17 |
|---|---|---|---|---|---|
| Copolymerization reaction | 9,10-Dihydrodicyclopentadiene derivatives | Kind | 9 and 10 Methoxy-9,10-dihydrodicyclopentadiene | 9 and 10 Hydroxy-9,10-dihydrocicyclopentadiene | None |
| | Styrene | Used amount$^{(g)}$ | 85 | 85 | — |
| | Solvent | Used amount$^{(g)}$ | 10 | 10 | 95 |
| | | Kind | Toluene | Toluene | Toluene |
| | | Used | 85 | 85 | 85 |

TABLE 16-continued

| | | Example 41 | Example 42 | Comparative Example 17 |
|---|---|---|---|---|
| | Kind | Di-tert-butyl peroxide | Di-tert-butyl peroxide | Di-tert-butyl peroxide |
| Catalyst | amount$^{(g)}$ Used | 3.0 | 3.0 | 3.0 |
| Gel generation amount (g) | | None | None | None |
| Hydrocarbon resin | Yield (g) amount$^{(g)}$ | 14 | 15 | 83 |
| | Dihydrodicyclopentadiene unit (mol %) | 20 | 25 | 0 |
| Resin characteristics | Softening point (JIS-K-2531 ring and ball method) (°C.) | 98 | 101 | 105 |
| | Color (JIS-K-5400 Gardner color scale) | 7 | 10 | 1 |
| Compatibility | Melt viscosity (EMILA viscometer, 200° C.) (cps) | 470 | 550 | 1200 |
| | Number-average molecular weight | 780 | 950 | 1350 |
| | Ethylene-Vinylacetate copolymer (Vinylacetate 19 wt %) | Δ | Δ | x |
| | Ethylene-Vinylacetate copolymer (Vinylacetate 28 wt %) | o | o | x |
| Compatibility | Bisphenol A type epoxy resin (epoxy equivalent: 500) | o | o | x |
| | Bisphenol A type epoxy resin (epoxy equivalent: 3000) | o | o | x |
| Heat resistance | | 9 | 11 | 2 |

EXAMPLE 43

Thirty grams of the hydrocarbon resin obtained in Example 23, 90 g of hexane and 0.6 g of a Ni-catalyst (N-113 manufactured by Nikki Chemical Co.) were charged into a 300 ml steel autoclave and, then, a hydrogen gas was pressurized into the autoclave up to 100 kg/cm$^2$. The mixture was heated to a temperature of 230° C. for 4 hours while agitating. After cooling, the autoclave was depressurized and the catalyst was removed from the polymerization mixture by filtration. The filtrate was then concentrated to obtain 27 g of a hydrocarbon resin.

The results are shown in Table 17.

TABLE 17

| Resin characteristics | Softening point (JIS-K-2531 ring and ball method) (°C.) | 94 |
|---|---|---|
| | Color (JIS-K-5400 Gardner color scale) | less than 1 |
| | Melt viscosity (EMILA viscometer, 200° C.) (cps) | 85 |
| | Number-average molecular weight | 540 |
| Compatibility | Ethylene-Vinylacetate copolymer (Vinylacetate 19 wt %) | |
| | Ethylene-Vinylacetate copolymer (Vinylacetate 28 wt %) | |
| | Natural rubber | |
| | Modified rosin | |
| Heat resistance | | 2 |

We claim:

1. A hydrocarbon resin consisting essentially of a copolymer of (A) at least one unsaturated hydrocarbon selected from the group consisting of (i) unsaturated chain hydrocarbons and (ii) cyclic hydrocarbons having vinylidene group and (B) at least one compound selected from the group consisting of 9,10-dihydrodicyclopentadiene and its derivatives, the amount of the polymerization unit of component (A) in the copolymer being 20 mol% to 98 mol% and that of component (B) in the copolymer being 80 mol% to 2 mol%.

2. A hydrocarbon resin as claimed in claim 1, wherein the resin has a softening point of 60° C. to 180° C., a melt viscosity of 5 cps to 10,000 cps and a number-average molecular weight of 300 to 15,000.

3. A hydrocarbon resin as claimed in claim 2, wherein the number-average molecular weight of the resin is 300 to 3000.

4. A hydrocarbon resin as claimed in claim 1 or 2, wherein the amount of the polymerization unit of component (A) is 30 mol% to 96 mol% and that of component (B) is 70 mol% to 4 mol%.

5. A hydrocarbon resin as claimed in claim 1 or 2, wherein component (A) is at least one monoolefin having the general formula:

$$R_1R_2C = CR_3R_4 \tag{I}$$

wherein $R_1$, $R_2$, $R_3$ are independently hydrogen or a methyl group, and $R_4$ is hydrogen or an alkyl group having 1 to 6 carbon atoms.

6. A hydrocarbon resin as claimed in claim 1 or 2, wherein component (A) is at least one diolefin having the general formula:

$$R_5R_6C = CR_7 - CR_8 = CR_9R_{10} \tag{II}$$

or $$R_{11}R_{12}C = CR_{13}(CR_{14}R_{15})_n CR_{16} = CR_{17}R_{18} \tag{III}$$

wherein $R_5$, $R_6$, $R_9$, $R_{11}$, $R_{12}$, and $R_{17}$ are independently hydrogen or a methyl group. $R_7$, $R_8$, $R_{10}$, $R_{13}$ to $R_{16}$, and $R_{18}$ are hydrogen or an alkyl group having 1 to 6 carbon atoms, and n is an integer of 1 to 4.

7. A hydrocarbon resin as claimed in claim 1 or 2, wherein component (A) is at least one cyclic hydrocarbon having a vinylidene group and having the general formula:

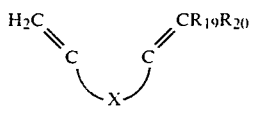
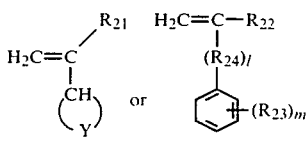

(IV)　　　(V)　　　(VI)

wherein $R_{19}$ to $R_{22}$ are independently hydrogen or a methyl group, $R_{23}$ is hydrogen or an alkyl group having 1 to 6 carbon atoms, and m is an integer of 0 to 3, $R_{23}$ may be the same or different in the case of $m=2$ or 3, $R_{24}$ is a saturated or unsaturated hydrocarbon chain having 1 to 6 carbon atoms, l is 0 or 1, X is a saturated or unsaturated hydrocarbon chain having 2 to 6 carbon atoms and Y is a saturated or unsaturated hydrocarbon chain having 3 to 7 carbon atoms, and the hydrocarbon chain represented by X and Y may be substituted with an alkyl group having 1 to 4 carbon atoms or a halogen atom.

8. A hydrocarbon resin as claimed in claim 1 or 2, wherein component (A) is at least one compound selected from the group consisting of chain diolefins having 4 to 6 carbon atoms, aromatic alkenyl compounds having 8 to 10 carbon atoms, and 1,2-dimethylidene compounds having 8 to 10 carbon atoms.

9. A hydrocarbon resin as claimed in claim 1 or 2, wherein component (A) is 1,3-pentadiene or a mixture thereof containing at least 30% by weight of 1,3-pentadiene.

10. A hydrocarbon resin as claimed in claim 1 or 2, wherein component (A) is at least one fraction selected from $C_4$, $C_5$, and $C_9$ fractions obtained as by-products from the refining and cracking of petroleum.

11. A hydrocarbon resin as claimed in claim 1 or 2, wherein component (A) is a $C_5$ fraction after isoprene removal.

12. A hydrocarbon resin as claimed in claim 1 or 2, wherein component (B) is 9,10-dihydrodicyclopentadiene.

13. A hydrocarbon resin as claimed in claim 1 or 2, wherein component (B) is 9 or 10-methoxy-9,10-dihydrodicyclopentadiene, or 9 or 10-hydroxy-9,10-dihydrodicyclopentadiene.

14. An adhesive comprising a hydrocarbon resin of claim 1 or 2.

15. A traffic paint comprising a hydrocarbon resin of claim 1 or 2.

* * * * *